(12) United States Patent
Zhang et al.

(10) Patent No.: US 9,139,188 B2
(45) Date of Patent: Sep. 22, 2015

(54) PREDICTION CONTROL STRATEGY FOR HYBRID MACHINERY

(71) Applicant: Caterpillar Inc., Peoria, IL (US)

(72) Inventors: Yanchai Zhang, Dunlap, IL (US); Evan Earl Jacobson, Edwards, IL (US); Bryan Thomas Siegel, Brimfield, IL (US); Timothy Michael O'Donnell, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 188 days.

(21) Appl. No.: 13/666,330

(22) Filed: Nov. 1, 2012

(65) Prior Publication Data

US 2014/0121868 A1    May 1, 2014

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 10/04 | (2006.01) |
| B60W 10/06 | (2006.01) |
| B60W 10/08 | (2006.01) |
| B60W 20/00 | (2006.01) |

(52) U.S. Cl.
CPC .............. *B60W 10/04* (2013.01); *B60W 10/06* (2013.01); *B60W 10/08* (2013.01); *B60W 20/00* (2013.01); *Y02T 10/6286* (2013.01)

(58) Field of Classification Search
CPC ..... B60W 10/04; B60W 10/06; B60W 10/08; B60W 20/00
USPC .............. 701/65, 96, 117, 122, 123, 400, 701/408–412, 22, 36, 103, 104, 108–110; 342/356, 357.02, 357.21, 357.24, 342/357.33, 357.34, 463–465; 455/456.1; 477/97, 3–5, 14, 91; 180/65.21–65.7; 475/5

See application file for complete search history.

(56) References Cited

U.S. PATENT DOCUMENTS

| 6,336,063 B1 * | 1/2002 | Lennevi ......................... 701/22 |
| 6,397,963 B1 * | 6/2002 | Lennevi .................. 180/65.235 |
| 6,558,290 B2 * | 5/2003 | Phillips et al. ..................... 477/5 |
| 7,143,851 B2 * | 12/2006 | Masterson ................. 180/65.25 |
| 7,559,388 B2 * | 7/2009 | Severinsky et al. ........ 180/65.28 |
| 2007/0005237 A1 * | 1/2007 | Needham et al. ............. 701/202 |
| 2011/0184602 A1 * | 7/2011 | Severinsky et al. ............. 701/22 |
| 2011/0190971 A1 * | 8/2011 | Severinsky et al. ............. 701/22 |

\* cited by examiner

*Primary Examiner* — James Trammell
*Assistant Examiner* — Majdi Alsomiri
(74) *Attorney, Agent, or Firm* — Miller, Matthias & Hull LLP

(57) ABSTRACT

A computing system may provide guidance to a vehicle with hybrid power systems on how to efficiently engage the hybrid systems and the primary power source on a given plan. As a result, additional efficiency may be obtained.

20 Claims, 8 Drawing Sheets

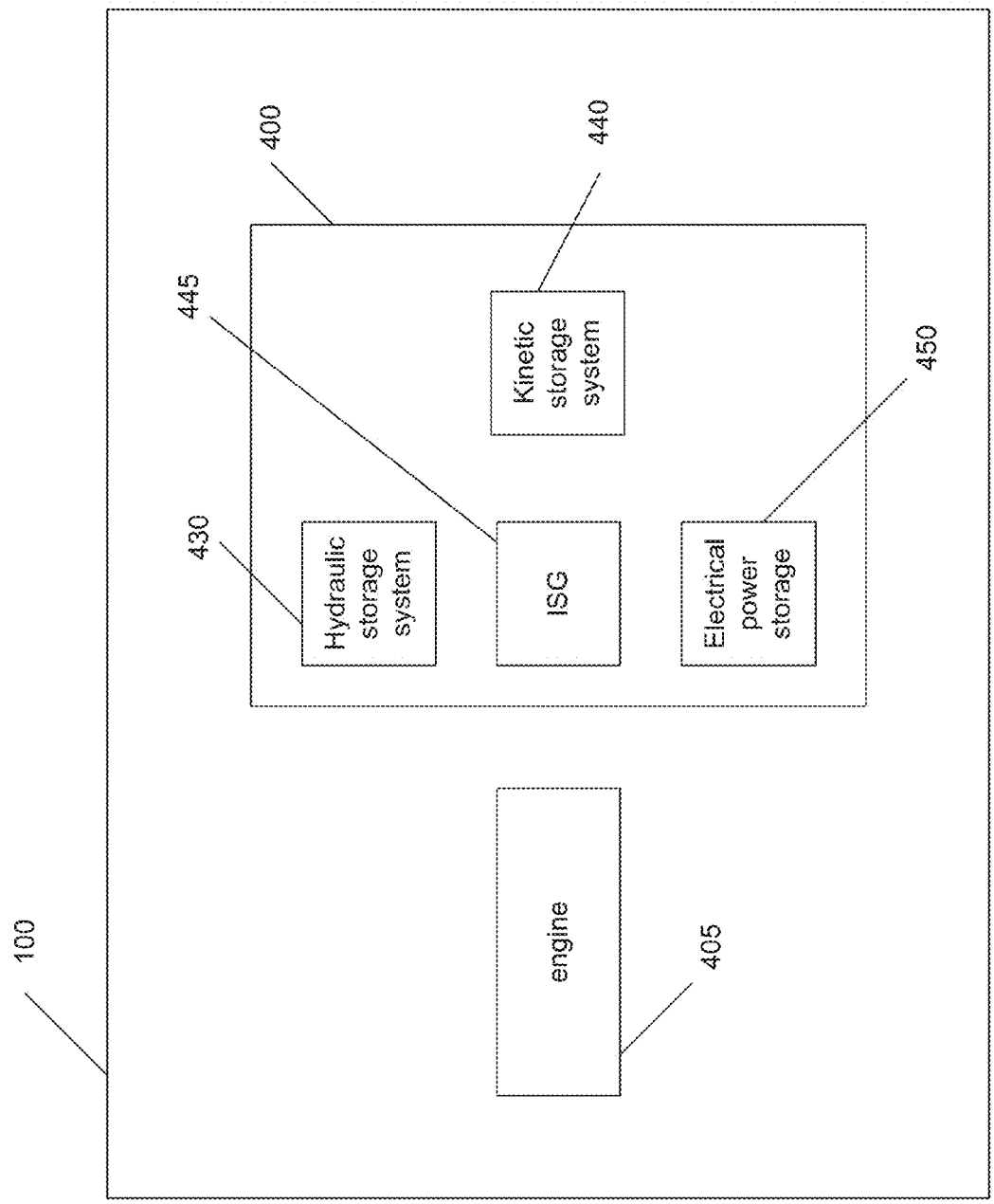

PREDICTION CONTROL STRATEGY FOR HYBRID MACHINERY

BACKGROUND

Moving a vehicle with hybrid power sources can be a challenge. Often, the devices are large to begin with making them a challenge to maneuver. Adding in hybrid power sources to a device cabin can add even more decisions to a driver who may already be overburdened with safely maneuvering the device. Expecting a driver to successfully engage and disengage a plurality of hybrid system is a lot to ask.

Some systems have attempted to make the decisions for a driver. However, these systems are unable to see what is coming ahead. Also, these systems also do not have the benefit of being able to be continuously fine-tuned as circumstances and constraints on the plan and vehicle change.

SUMMARY

A method, computer system and computer storage medium for implementing a method of using prediction control for a hybrid device is disclosed. Electronic position data for a device may be accessed where the electronic position data comprises three dimensional position data. Electronic plan data for a device may be accessed where the electronic plan data is in three dimensions and includes a start point, an end point and a proposed plan. Load data for a device may be accessed and a power strategy may be determined.

The power strategy may include an engine management strategy and hybrid management strategy which may include analyzing the electronic position data, the electronic plan data and the load data. The power strategy may provide the hybrid strategy and engine strategy to efficiently and safely move the vehicle. One of the many benefits is that the hybrid system may operate in a more efficient manner than previously possible.

BRIEF DESCRIPTION OF THE DRAWINGS

FIG. 4a is an illustration of a hybrid power system;

FIG. 5 is an illustration of a method of

DESCRIPTION

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

At a high level, a computing system may provide guidance to a vehicle with hybrid power systems on how to efficiently engage the hybrid systems and the primary power source on a given plan. As a result, additional efficiency may be obtained. The system may not be limited to just road plans but also may work in other situations. Applied loads, such as tool engaging the ground when farming or bucket of a loader may also benefit from the system.

Figure 1:
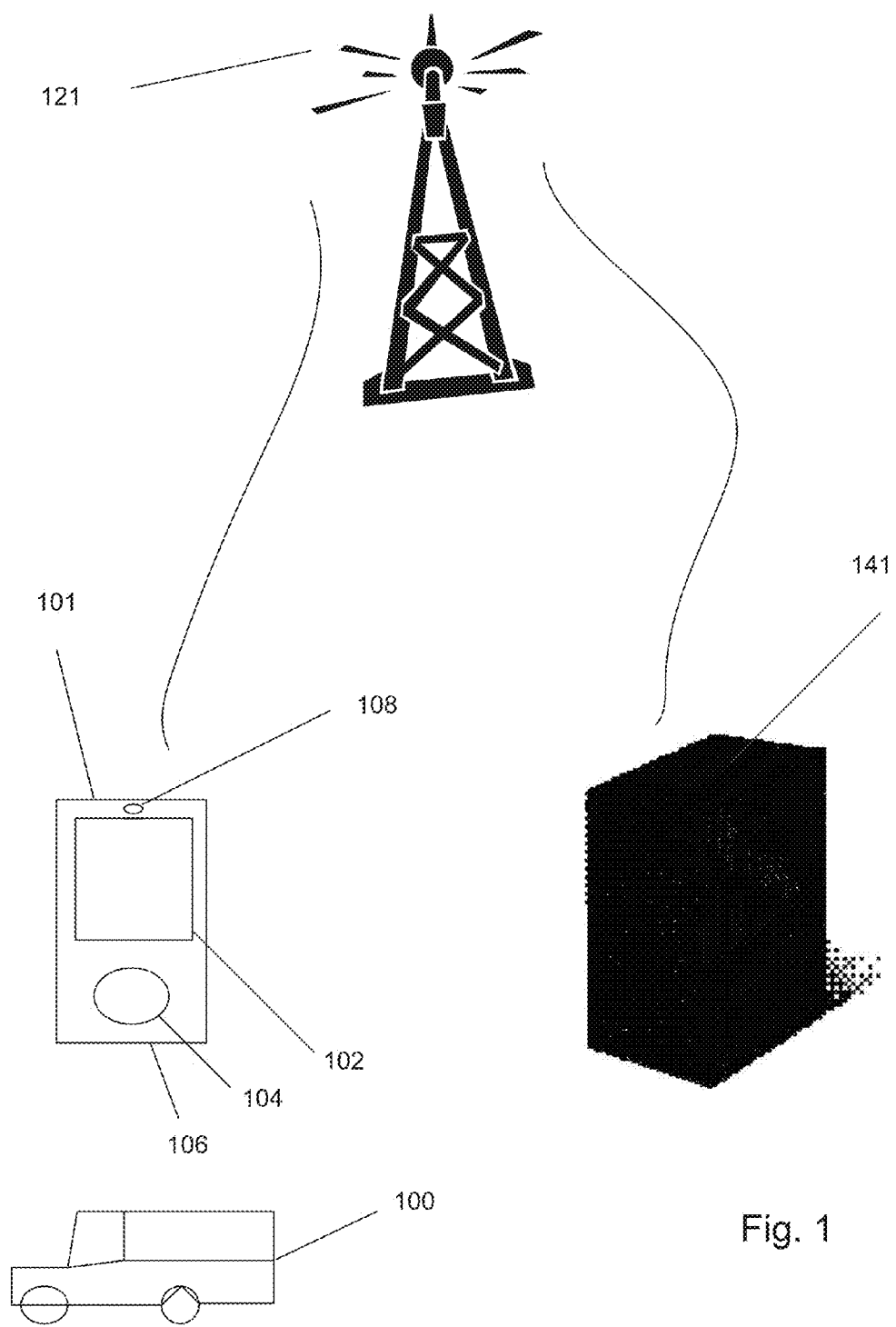
FIG. 1 is an illustration of a mobile computing device, a server type computer device and a communication device.

FIG. 1 may be a high level illustration of some of the elements a sample computing system. The computing system may be a dedicated computing device, a dedicated portable computing device, an application on the computing device, an application on the portable computing device or a combination of all of these. FIG. 1 may be a high level illustration of a portable computing device communicating with a remote computing device but the application may be stored and accessed in a variety of ways. In addition, the application may be obtained in a variety of ways such as from an app store, from a manufacturer, from a dealer or from an inspector. There may be various versions of the application to take advantage of the benefits of different computing devices, different languages and different API platforms.

In one embodiment, a portable computing device 101 may be a device that operates using a portable power source such as a battery. The portable computing device 101 may also have a display 102 which may or may not be a touch sensitive display. More specifically, the display 102 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data and a camera 108 to accept images.

Figure 2:
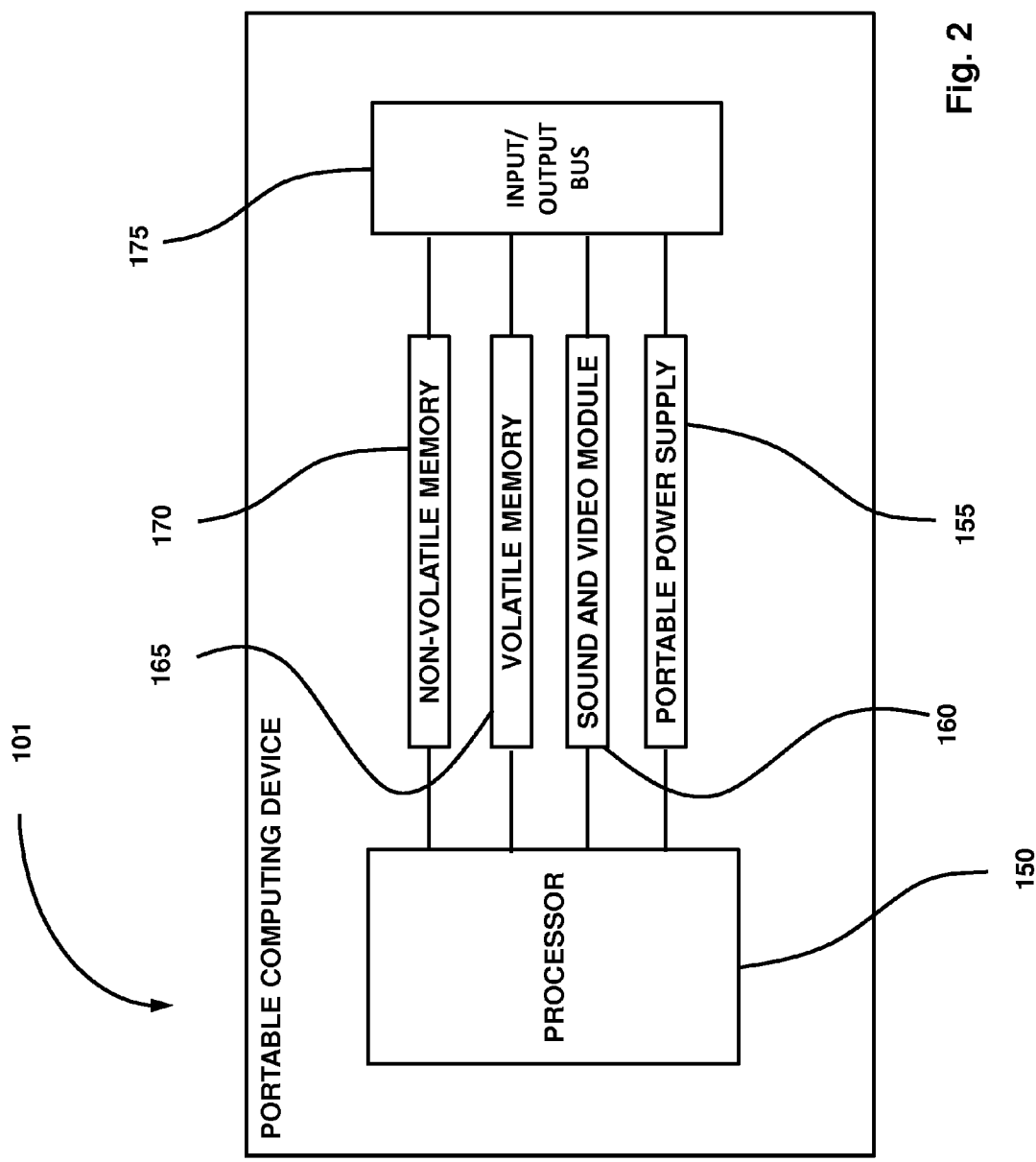
FIG. 2 is an illustration of a portable computing device.

The portable computing device 101 may be able to communicate with a computing device 141 or a plurality of computing devices 141 that make up a cloud of computing devices 111. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication network 121 such as cellular service, through the Internet, through a private network, through Bluetooth, etc. FIG. 2 may be a simplified illustration of the physical elements that make up a portable computing device 101 and FIG. 3 may be a simplified illustration of the physical elements that make up a server type computing device 141.

FIG. 2 may be a sample portable computing device 101 that is physically configured according to be part of the system. The portable computing device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computing device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computing device 101 and the number and types of portable computing devices 101 is limited only by the imagination.

Figure 3:
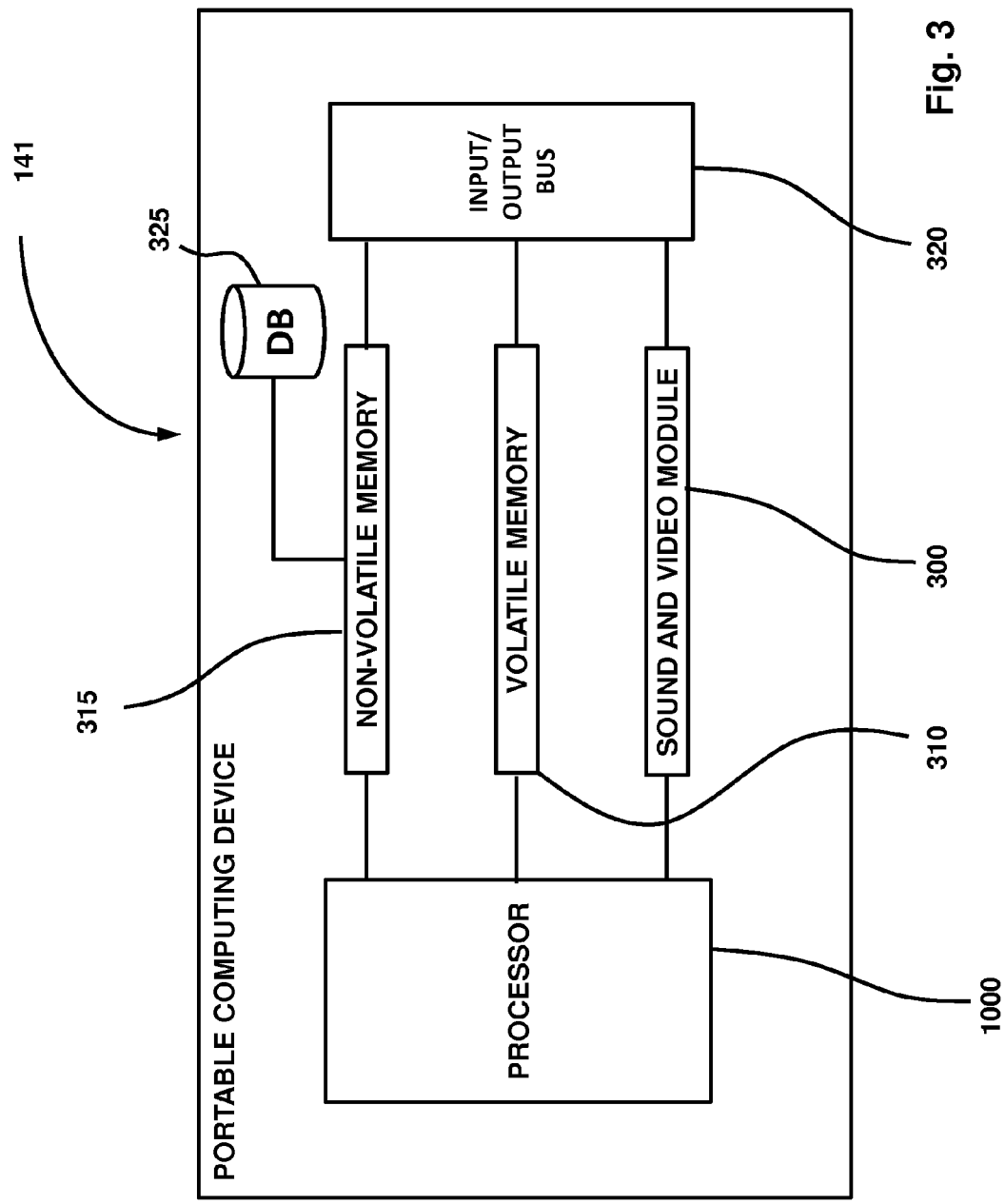
FIG. 3 is an illustration of a server type computing device.

The physical elements that make up the computing device 141 may be further illustrated in FIG. 3. At a high level, the computing device 141 may include a digital storage such as a magnetic disk, an optical disk, flash storage, non-volatile storage, etc. Structured data may be stored in the digital storage such as in a database. The server 141 may have a processor 1000 that is physically configured according to computer executable instructions. It may also have a sound and video module 300 which assists in displaying video and sound and may turn off when not in use to conserve power and battery life. The server 141 may also have volatile memory 310 and non-volatile memory 315. The database 325 may be stored in the memory 310 or 315 or may be separate. The database 325 may also be part of a cloud of computing device 141 and may be stored in a distributed manner across a plurality of computing devices 141. There also may be an input/output bus 320 that shuttles data to and from the various user input devices such as the microphone 106, the camera 108, the inputs 102, etc. The input/output bus 1040 also may control of communicating with the networks, either through wireless or wired devices. In some embodiments, the application may be on the local computing device and in other embodiments, the application may be local. Of course, this is just one embodiment of the server 141 and the number and types of portable computing devices 141 is limited only by the imagination.

In yet another embodiment, radio transmission devices may be used to communicate information about the vehicle and the plan 600 to the computing device. For example, the vehicle may have a wireless transmitter that may communicate with an authorized computing device. In some embodiments, the vehicle may use satellite communications to communicate data. In yet another embodiment, the vehicle may rely on cellular communication to communicate data when in range of a cell tower or a cellular phone that has been configured to communicate data on behalf of the object. In some embodiments, data may be pushed from the vehicle and stored over time as the communications are received rather than having the data pulled.

In yet another embodiment, the vehicle 100 may have a wired communication port which may allow the vehicle to communicate with the computing device 141. The port may be an Ethernet port, an ECM port or any other appropriate port that facilitate communication between the vehicle and the computing device. A wired connection may be made between the vehicle and the computing device 141 and the devices may communicate data as may be appropriate such as velocity data, location data, hybrid state data, etc.

The application may be created in a way such that the application may execute if the computing device is not in communication with a network. The current system may use HTML5 and web services according to the web services standard (which may be found at http://www.w3.org/2002/ws/) and locally stored forms to obtain data.

Figure 4B:
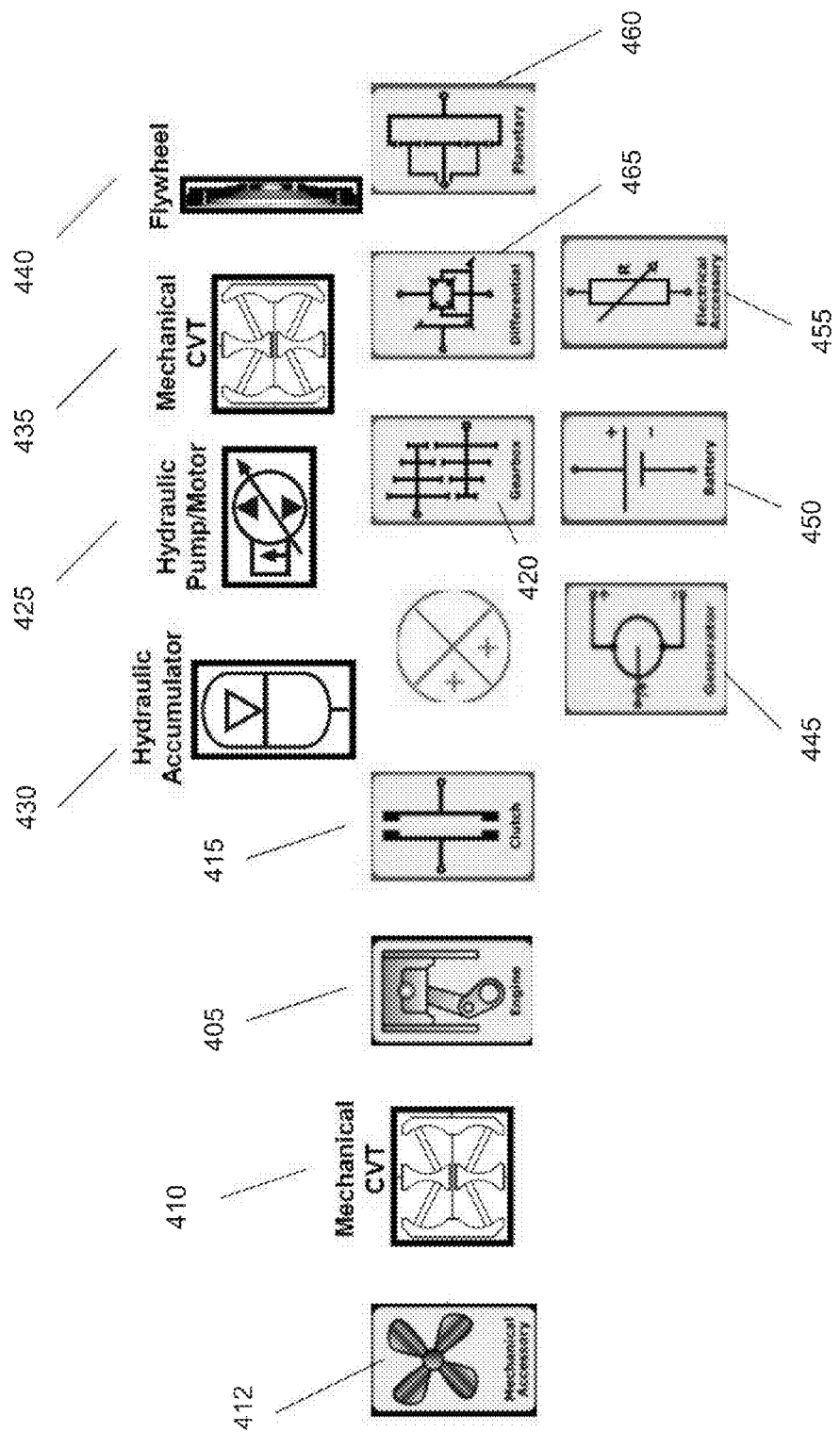
FIG. 4b is an illustration of a hybrid power system.
Figure 5:
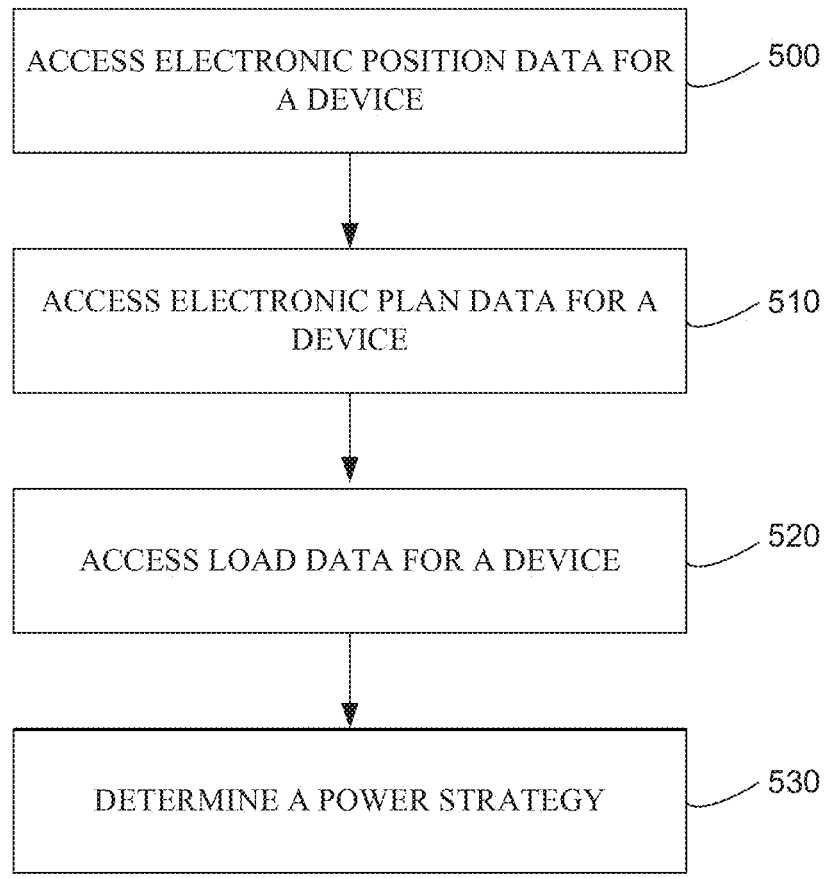

FIG. 5 may be an illustration of a method of using prediction control for a hybrid device. The hybrid device 100 may be a device that includes a hybrid powertrain. In some embodiments, the hybrid device may be a large device such as a semi-truck, an earthmover, a digger, etc. The hybrid systems may include an electronic storage system, a kinetic storage system and a hydraulic storage system. FIGS. 4a and 4b may be illustrations of the elements of a hybrid powertrain.

FIG. 4a illustrates one embodiment of a power platform for a motorized work device 100. As mentioned previously, the work device 100 may be a variety of devices and some example work devices may include, but should not be limited to, bulldozers, diggers, earth movers, graders, haulers, cars, etc. In general, the work devices 100 have an internal combustion based power source, such as an engine that operates on diesel fuel or gasoline or any other appropriate fuel. Other systems could operate using the power from the power source such as hydraulic systems but the other systems did not store or contribute power back to the power source. In the past, the internal combustion engine had to be sized such that it could provide sufficient power alone to operate the vehicle as it did not have any other power supplying systems to rely upon.

There are a variety of hybrid power source that may assist a main power source, each of which has its own advantages and disadvantages. FIG. 4a may illustrate a variety of hybrid power sources that may be part of a work device 100. At a high level, the hybrid power sources 400 may store power when excess power is available, such as when a device 100 is traveling downhill, and may supply power when excess power is needed such as lifting a heavy object. At times, the hybrid sources may be the primary source of power. At other times, the hybrid sources 400 may not supply any power to the main source of power. At yet other times, one or more of the hybrid power sources 400 may assist the main power source 405 when excess power is needed. The decision of which hybrid source 400 to use and when may be governed by an algorithm. The result of the hybrid system is that a smaller main power 405 source may be used which may result in a more efficient system.

FIG. 4a is an illustration of a sample work device 100 with hybrid power sources 400. In one embodiment, an internal combustion engine 405 may be the main source of power and may be used along with the hybrid power sources 400. In other embodiments, any of the hybrid sources 400 of power may be the main power source 405 with the other hybrid power sources 400 supplying power on an as needed basis. The main power source 405 may be smaller than a single main power source 405 as the hybrid sources 400 may provide additional power when needed such that the main power source 405 may be smaller, lighter and more efficient than in a device without the hybrid power sources 400.

Referring to FIG. 4b, possible sources of hybrid power 400 and storage may include a kinetic device, such as a flywheel 440, a hydraulic device 430 such as a large hydraulic accumulator in communication with a hydraulic pump/motor 425 and an integrated starter/generator 445 that may be connected to various electricity storage devices 450 such as batteries or capacitors. Of course, some of the hybrid sources 400 may be omitted and others added. The disclosed combinations and arrangements are not meant to be limiting but only example as there are a variety of ways to uses hybrid power systems 400 with a main power system and all of these various arrangements are possible and contemplated.

In operation, the main power source may be an engine 405. The power from the engine 405 may pass through an engine crankshaft to a mechanical transmission such as a continuously variable transmission or a clutched gearbox to power mechanical accessories 412. The power may also pass through a clutch 415. The clutch 415 may be engaged during most operations. The clutch 415 may be opened or disengaged when the machine 100 is at idle. The clutch 415 may also be open during engine off events. In such a situation, the engine 405 may be started without the burden of powering the hybrid systems 400 or other downstream loads. In addition, the hybrid systems 400 may be used to power the device 100 such as in creep mode when the main engine 405 is off.

The clutch 415 may also be in communication with a gear box 420 which may amplify or reduce the rotational speed or torque of the hybrid sources 400 and the main power source 405. From the gearbox 420, power may be in communication with a hydraulic pump/motor 425. In times of excess power, the hydraulic pump/motor 425 may operate to fill the hydraulic accumulator 430 with fluid under pressure. In times of power need, the force stored in the accumulator 430 may be released to provide force to the hydraulic pump/motor 425 which may communicate the power to the gearbox, 420, the clutch 415 and then the main power source 405.

The gearbox 420 may also be in communication with an additional mechanical continuously variable transmission 435 which may be in communication with a kinetic storage object 440 such as a flywheel. In times of excess power, the mechanical continuously variable transmission 435 may communicate power to the kinetic storage device 240 which may spin an object, thereby storing the energy. In times of power need, the kinetic energy stored in the kinetic storage object 440 may be release to the mechanical continuously variable transmission 435 which may communicate to the gearbox 420 and then to the main power source 405.

The gearbox 420 may also be in communication with an integrated starter/generator 445. The integrated starter/generator 445 may operate as a starter and a motor, adding power to the main power unit 405 when needed. The power for the integrated starter/generator 445 may come from an electrical storage device 450 such as a battery or capacitor. In addition, electrical accessories 455 may operate by drawing on the electrical storage device 450. In times when there is excess power, the integrated starter/generator 445 may spin and generate electricity which may be stored in the electronic storage device 450.

Logically, the main power source 405 may be in communication with the gearbox 420 which may provide power to the differential 465 and a planetary gear 460. In some situations, the main power source 405 and the hybrid power sources 400 may provide power to the planetary gears 460 which may then power the device 100. In other situations, the planetary gears 460 may provide excess force to the device 100 such as when the vehicle 100 is traveling downhill. This excess power may be used to provide power to the various hybrid systems 400 to be stored for a later time. Similarly, when the device 100 is braking, the excess force may be used to charge the various hybrid systems 400. In yet another aspect, when the main power source 405 is operating at a desired speed but the device 100 does not require all the power, the excess power may be diverted to the hybrid power sources 400 to be stored for future use.

Referring again to FIG. 5, at block 500, electronic position data for a device may be accessed. The electronic position data may include three dimensional position data, such as x, y and z data. The data may be provided from a global position satellite device (GPS) which may provide a street, path or plan location and a height above sea level. In other embodiments, the location of the device may be provided by triangulation from devices with known locations such as cell phone tower triangulation, Wi-Fi tri-angulation, analysis of camera videos from the vehicle, from manual user input, etc. In yet another embodiment, a camera on the device may provide a visual location signal which may be analyzed to provide a location. Of course, other methods of locating a device in a three dimensional space are possible and are contemplated. The data may be stored locally or remotely and may be accessible through a variety of electronic devices.

Figure 6:
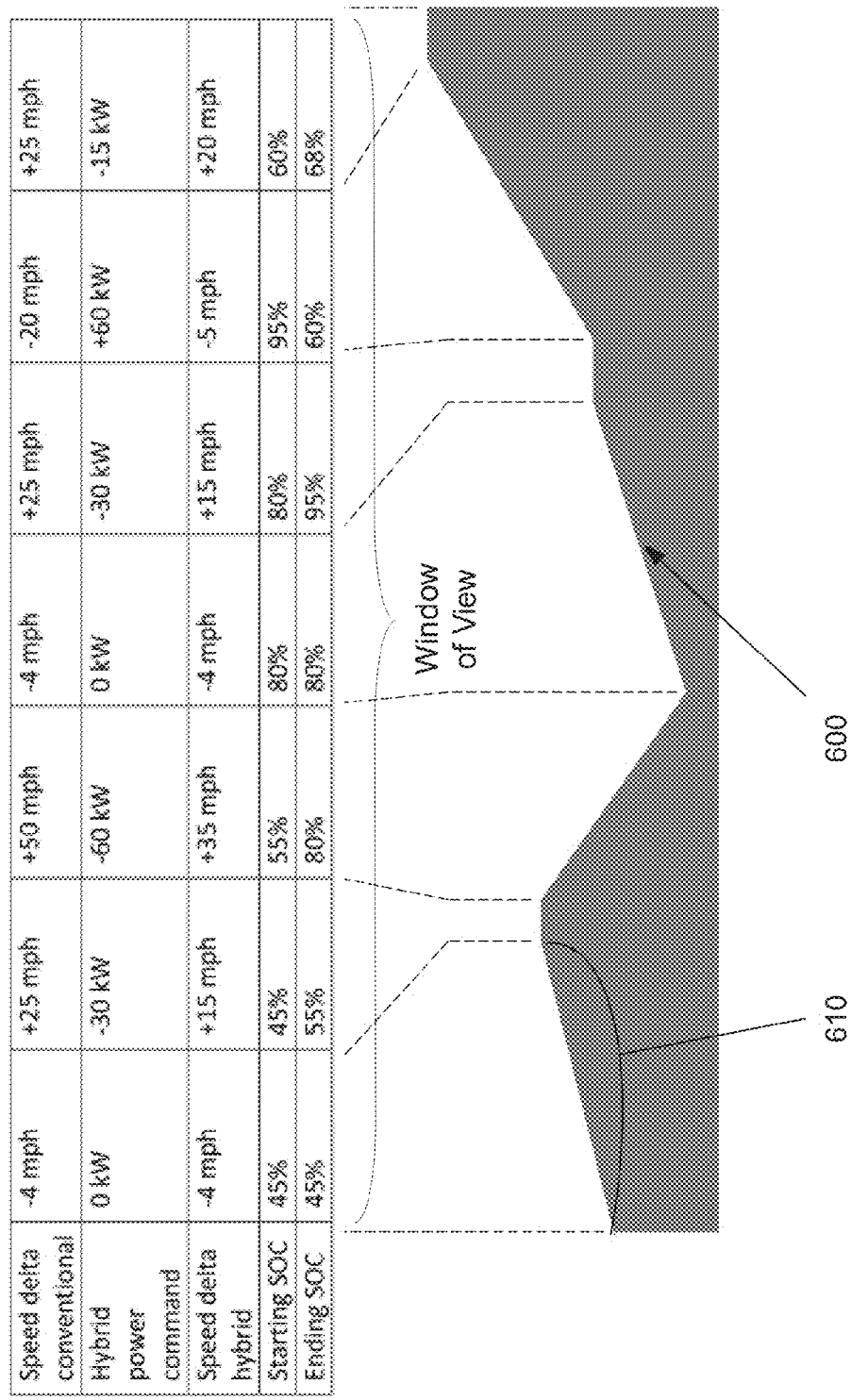
FIG. 6 is an illustration of the method applied to a vehicle on a plan.

At block 510, an electronic plan 600 data for a device may be accessed. The data may be stored locally or remotely and may be accessible through a variety of electronic devices. The electronic plan 600 data may be in three dimensions and may include a start point, an end point and a proposed plan. The plan 600 may be broken into numerous segments. Referring to FIG. 6, a first segment 610 may be a slight uphill segment, a second segment 610 may be flat, a third segment 610 may be a negative grade segment, a fourth segment 610 may be a positive grade segment, etc. The segments may be related by the operation of the engine 405 and the hybrid system 400. As an example, a positive grade may require engine 405 or hybrid input 400 in order to overcome the grade and maintain a desired speed as gravity and friction may require input to maintain the desired velocity. Similarly, a section of highway with an increased speed limit may require input from the engine or the hybrid system to reach the desire velocity. In contrast, a negative grade may allow an engine to rest and a hybrid system 400 to store excess energy. Further, a turn may require a reduction in velocity which may allow an engine to rest and the hybrid system to store energy.

The plan 600 may be from public information such as road maps or online tools. In other embodiments, the plan 600 may be though a mine and the plan 600 may have to be created. In yet additional embodiments, the plan may be for driving a device 100 through a farm field. In another embodiment, the plan 600 may be for lifting material from a first location to a second location. In other embodiments, the plan 600 may be traversed and memorized for future use. As will be discuss further, the memorized plan 600 may be reviewed to further refine the efficiency on that plan 600.

Referring to FIG. 6 again, the state-of-charge (SOC) of the hybrid system may be viewed in order to optimize fuel consumption. In one embodiment, in comparison to the conventional (no hybrid or poorly managed hybrid) case, uphill speed deltas (negative) may be viewed and downhill speed deltas (positive) may be noted as being less. The delta is derived from the capability of the machine, and may (as in this case) only consider the propulsion system's capability for powering and retarding (service brakes would be excluded).

Notice on the first hill, the SOC may be relatively low. The hybrid may remain off, and the performance may match conventional performance. On the first flat portion, the system may take advantage of the propulsion system's excess capability to store some energy for later use. The approach may result at the expense of greater fuel burn, but knowing that the large hill is coming at the end of the segment, and it may be wise to start storing energy. Note that a higher SOC may be obtained than when the trip started. The increase in SOC may be the result of starting at a relatively low SOC (based upon analysis across the prior window of view). Since the next window of view may still be unknown, it may be logical to be somewhat conservative and error on the side of having more than 50% storage in the hybrid system.

The plan may also relate to a vehicle 100 such as a loader picking up a load of material in a bucket and placing it in a truck. The lifting of the material may require additional power which may be from the hybrid system 405. The lowering of the bucket may be an opportunity to generate power for the hybrid system 405 as gravity may pull the bucket. The plan data may map about the lifting and lowering of the bucket as electronic position data in an x, y, z space similar to mapping a road and the plan data may be used to create a power plan for the vehicle 100, specifically, the loader. Of course, the power plan concept may be adapted to a variety of vehicles 100 and situations such as in farming situations, mining operations, digging operations, etc.

At block 520, the load data for a device may be accessed. The load may relate to the mass or weight of the device. The larger the mass or weight, the more energy may be needed to transport the device. Logically, a large mass or weight proceeding downhill may produce excess energy which may be stored and a large mass or weight proceeding uphill may require additional energy in comparison to a vehicle with less mass or weight. As is known, force equals mass multiplied by acceleration so knowing mass and force capacity may enable the acceleration and thus velocity with time to be determined or estimated for a variety of situations. Applied load, such as lifting a load of material, may also be used as load data depending on the vehicle 100 in question.

At block 530, a power strategy may be determined. The power strategy may be made up of an engine management strategy and hybrid management strategy. The engine management strategy may include the speed of the engine such as revolutions per minute (RPM) which may determine an amount of available torque. It also may include the strategy to get the engine to the desired speed at the desired time. Further, the engine strategy may include the gear selection for the device that may result in the desired velocity and the desired engine speed.

The hybrid management strategy may include the using the electronic position data, the electronic plan 600 data and the load data to determine when to engage the hybrid power systems and which of the hybrid power systems to engage. Further, by analyzing the plan 600 or a plurality of plans, the availability of excess power may be determined or the need for additional power also may be determined.

Figure 7:
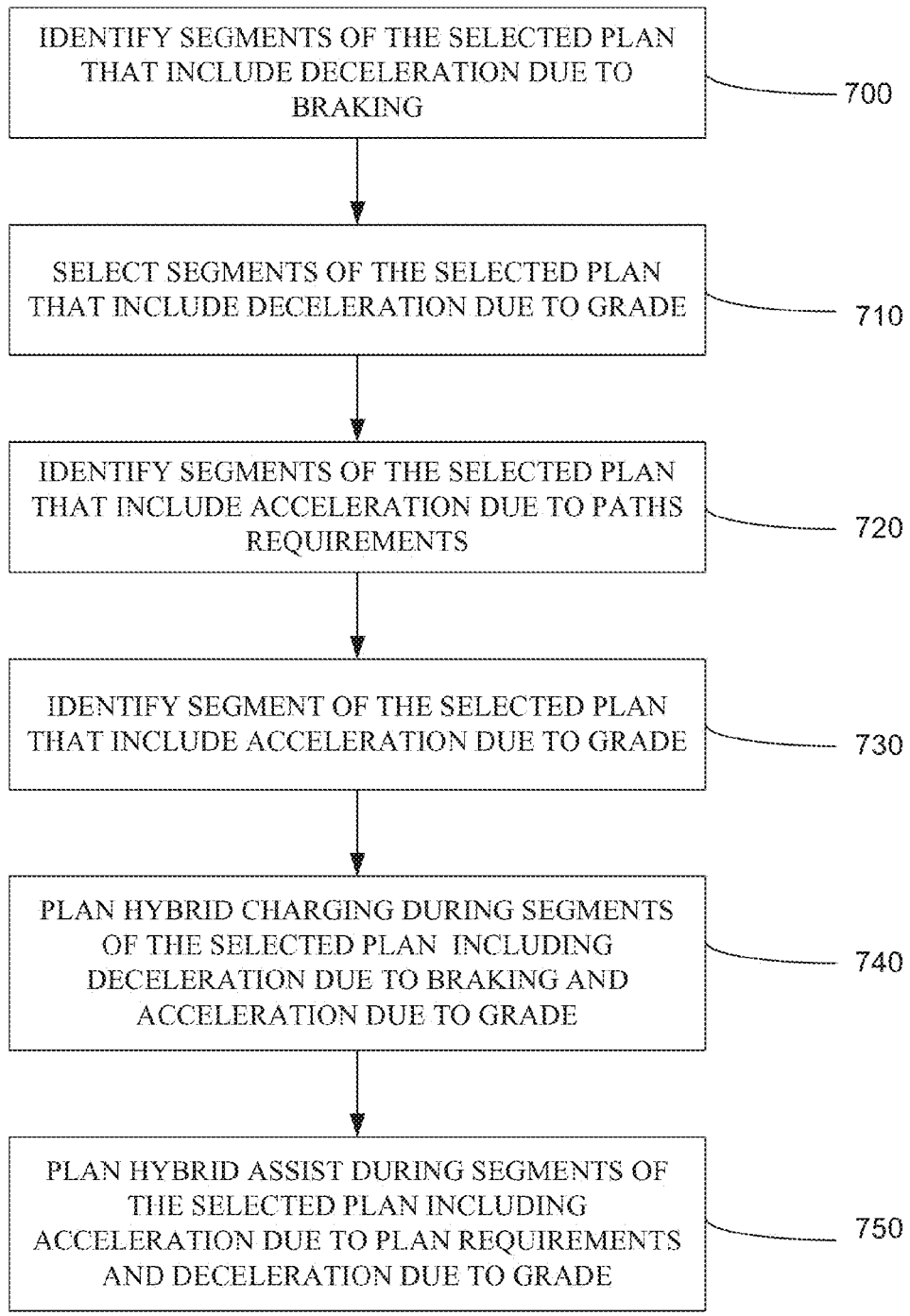
FIG. 7 is an illustration of a method of applying the hybrid assist method.

FIG. 7 may illustrate one manner of analyzing segments of a plan 600 for determining the hybrid management strategy. At a high level, some segments of a plan 600 may generate excess energy in the vehicle which may be stored in the hybrid systems 400 and at other times, the plan 600 may require additional energy from the vehicle 100 which may be provided by the hybrid system.

At block 700, segments of the selected plan 600 may be identified that include deceleration due to braking. Braking may be required to slow the vehicle 100 to stay within speed limits or a safe speed based on the load of the vehicle 100 and the location of the vehicle 100, such as if the vehicle 100 is approaching a sharp turn. Engaging the hybrid systems 400 to store energy may have a braking effect on the vehicle 100. The braking effect may be known leading to a predictable amount of braking force to the vehicle 100 such that the velocity may be predicted. Braking also may be used in lifting vehicles. For example, a bucket on a loader may be lowered slowly. The hybrid systems 405 may be engaged to provide resistance to brake the bucket into a slow decent rather than slamming to the ground.

At block 710, segments of the selected plan 600 may be selected that include deceleration due to grade. For example, if a vehicle 100 is climbing a hill, the vehicle 100 may decelerate. In order to maintain a desired velocity, additional power may be required. The additional power may come from the main power source 405 or from the hybrid system 400 if sufficient power is available.

At block 720, segments of the selected plan 600 may be identified that include acceleration due to plan requirements. As an example, a speed limit on a plan 600 may change which may require the vehicle 100 to accelerate in order to safely travel in traffic. The acceleration may be provided from the main power source of from the hybrid system 400 if sufficient power is available. Acceleration also may be used in lifting vehicles. For example, a bucket on a loader may be very heavy and may require additional power. The hybrid systems 405 may be engaged to provide the additional power to lift the bucket rather than increasing the speed of the primary power source 400.

At block 730, segments of the selected plan 600 may be identified that include acceleration due to grade. If the vehicle 100 is traveling downhill, the vehicle 100 may need to be slowed. Slowing a vehicle 100 may be accomplished by engaging the hybrid systems 405 to store energy. The braking effect may be known leading to a predictable amount of braking force to the vehicle 100 such that the velocity may be predicted.

At block 740, hybrid charging may be planned during segments of the selected plan 600 including deceleration due to braking and acceleration due to grade. The hybrid system 400 may cause the vehicle 100 to slow by taking the excess energy and transferring it to hybrid storage such as a battery 450, a hydraulic accumulator 430 or a flywheel 440. For example, an integrated starter/generator 445 may be engaged to produce electricity which may be stored in a battery or capacitor 450. Similarly, the excess power may be applied to a kinetic storage device 440 which may store the excess energy in a spinning object. In addition, the excess power may be applied to a hydraulic pump 425 which may fill an accumulator 430 which may be used at a point in the future to provide lift.

In some situations, the application of the hybrid source 400 may be sufficient to slow the vehicle 100 to the desired velocity. In other embodiments, brakes may also have to be applied in addition to engaging the hybrid systems 400. The amount of acceleration and deceleration from the variety of factors may be estimated and the duration and amount of the hybrid charging may be estimated.

The braking effect from the hybrid source 400 may be may be known leading to a predictable amount of braking force to the vehicle 100 such that the velocity may be predicted. More specifically, the weight and mass of the vehicle may be known, the slope of the plan 600 may be known and the effect of the hybrid sources 400 may also be known.

At block 750, hybrid assist may be planned during segments of the selected plan 600 including acceleration due to plan 600 requirements and deceleration due to grade. Logically, if the vehicle 100 is slowed below a desired velocity, it may require additional force to stay at the desired velocity. For example, many roads have minimum speeds. While it may be fun to attempt to obtain the maximum mileage from the drivetrain, speed laws still need to be respected. In addition, going too slow may result in the vehicle 100 being a danger to other vehicles. Thus, a minimum speed may need to be respected. Similarly, traffic may be moving especially fast and it may be desirable to add additional speed to safely keep up with traffic.

Related, the slope of a road may require addition power to be added in order to the vehicle 100 to maintain the desired velocity. Naturally, a slope may slow a vehicle 100. In some instances, the vehicle 100 may have sufficient kinetic energy to overcome the slope. In other instances, additional power may be required. Knowing that power may be required, the various hybrid systems 400 may be evaluated and one or more of the hybrid systems 400 may be prepared for engagement.

The determination of the manner of supplying power may be accomplished in a variety of ways. In one embodiment, the proposed plan 600 for downhill segments may be analyzed as these segments will likely produce excess power. A minimum desired velocity to reach the downhill segment 610 may be determined. In some embodiments, a maximum desired velocity may also be determined. Once a minimum is determined, a hybrid energy storing segment 610 may be added during the downhill segment. The amount, type and duration of the hybrid charging may be determined.

Determining a minimum velocity and a maximum velocity may be accomplished using past course analysis or mathematical estimations. For example, a terminal velocity for the vehicle 100 may be determined if no hybrid systems are engaged on a certain road segment. In addition, a desired terminal velocity for the vehicle 100 may be determined in view of the upcoming electronic plan, the vehicle 100 load, the weather, the traffic, etc. Related, the desired hybrid system 400 engagement may be determined in order to obtain the desired terminal velocity.

Hybrid systems 400 may create a drag on the vehicle 100. The drag may be great enough to slow the vehicle 100. The effect of the hybrid 400 drag may be determined or estimated. For example, it may be known the engaging an integrated starter/generator 445 may provide a negative acceleration when a vehicle 100 with 18 properly inflated wheels is driving down a 5% asphalt grade.

The majority of factors that affect the velocity of a vehicle 100 may be known or determined. For example, the rolling resistance of the tires may be determined or known. Similarly, the wind speed and wind resistance or aerodynamic drag of the vehicle 100 may be known or determined. The acceleration effect of gravity on a vehicle 100 of the known weight may also be known or determined.

Related, the negative effect of engaging one or more of the hybrid systems may also be known or determined. For example, the effect of engaging a generator 445 may slow the vehicle 100 by a known percent. Similarly, engaging a kinetic storage device 445 may create a known amount of drag on the system that may offset or reduce the effect of gravity based acceleration.

By summing all the acceleration effects and the present velocity, the velocity of the vehicle 100 at the points on the segment 610 may be determined. In addition, in some embodiments, the predicted velocity may be compared to the actual velocity and the prediction may be updated and the hybrid engagement may also be adjusted to further control the velocity.

The system may also take into account upcoming road sections in determining a desired velocity. For example, if vehicle is proceeding downhill but is approaching an uphill section, it may be desire to reach the uphill section at a higher end of an acceptable velocity range. Similarly, if a steeper downhill section is coming, it may be desirable to reach the steeper section at a lower end of a velocity range.

An additional decision may be to determine which of the hybrid systems 400 may be engaged. The decision may be based on a variety of factors which may be scored to determine a hybrid strategy. For example, if a hybrid device 400 is already filled to its storage capacity, it may make little sense to attempt to engage that hybrid storage 400 system. Logically, if a hybrid storage system 400 has plenty of capacity, then it may make sense to engage that hybrid storage 400 system. Likewise, a gradual slowing may lend itself better to a first hybrid system 400 while an immediate slowing may lend itself better to a second hybrid system 400.

Braking segments in the proposed plan 600 may also be identified. Braking requires providing a negative acceleration force. Engaging one or more of the hybrid systems 400 may also be used to provide a negative acceleration force. In addition, the negative acceleration force of each hybrid system 400 may be determined and used to slow the vehicle. By determining a desired velocity during the braking segments, the amount of negative acceleration may be determined. The negative acceleration may be provided by the hybrid system 400 engagement or brakes to obtain the desired velocity during the braking segments.

A similar approach may be used for segments that require acceleration on proposed plan. There may be a goal of using as much hybrid 400 power as possible which may mean the first source of acceleration may be hybrid power 400 and the secondary source may be the primary power source. In some segments, it may be immediately known there may be sufficient hybrid power 400 to meet the acceleration segments and the hybrid power 400 may be used to provide the acceleration. In other segments, additional power may be required from non-hybrid 405 sources.

An additional decision may be to determine which of the hybrid systems 400 may be engaged. The decision may be based on a variety of factors which may be scored to determine a hybrid strategy. For example, if a hybrid device 400 is full in its storage capacity, it may make little sense to attempt to engage that hybrid storage 400 system to store energy but may make sense to provide energy. Logically, if a hybrid storage 400 system has plenty of capacity, then it may make more sense to engage that hybrid storage 400 system to store energy. Likewise, a gradual acceleration may lend itself better to a first hybrid system 400 while an immediate acceleration may lend itself better to a second hybrid system 400.

Current traffic may also be used in planning the power strategy which may include the engine strategy and the hybrid strategy. As an example, the amount of braking may be increased if there is heavy traffic and this braking may be used to generate hybrid energy which may be stored. Similarly, if there is less traffic than usual, less braking may be required which may mean that less hybrid power may be created.

The engine management strategy may be very detailed. In some embodiments, the engine management strategy may select an optimal gear and selecting an optimal engine 405 speed for segments of the selected plan 600. For example, the power strategy may know that hybrid power may be available to assist the main power source. If there was not additional power, the engine 405 may have had to shift down gears. However, as additional torque may be supplied from a hybrid source, the present gear may be maintained. Similarly, if the engine management strategy knows that there is no hybrid power available, a lower gear may be selected sooner knowing that a lower gear may require higher rpms and more power from the main power source.

While following the plan 600, additional inputs may be used to fine tune the power strategy. As previously mentioned, traffic reports and weather reports may be just some of the additional information that may be used by the system. The system may also use sensors in the vehicle to make fine adjustments to the engine management strategy and hybrid management strategy. As an example, some vehicles have adaptive cruise control which uses sensors such as lasers, wave emitters, wave receivers, etc., to keep a given distance between vehicles. This same information may be used by the system to determine how to manage the hybrid system 400 and the engine system 405. For example, is the cruise control is set as 30 mph and the brakes are being repeatedly applied, this may indicate heavy traffic and that it may be appropriate to switch to an approach that may maximize fuel efficiency in times of heavy traffic. Speed limits may also be taken into account in determining the plan 600 as may be weather, accident reports, reported traffic speeds and current fuel costs.

Another possible input is from mobile communication devices 101. The progress of a mobile communication device 101 may be tracked in a variety of ways, such as through cell tower triangulation, cell tower power measurements, relation to other cell phones, etc. The progress of the mobile communication device 101 may provide an insight into the type of traffic, obstacles, the progress against plan, etc.

Of course, global position satellite information may be used to track a vehicle 100 and compare its progress to the planned progress. Global positioning systems (GPS) are known and provide a location within a few feet. The GPS data of a vehicle 100 may be analyzed over time to determine the location, velocity and direction of the vehicle which may be used to fine tune the performance plan of the vehicle 100, including the hybrid plan and the engine power plant plan. For example, if the vehicle 100 is behind the plan, it may not make sense to add hybrid power 400 until a hill is actually encountered. By watching the GPS location, the system made know the actual location of the vehicle 100 and may provide hybrid and engine guidance based on the actual vehicle 100 location.

For improved performance, data from past plans 600 may be stored and reviewed to improve future trips according to the plan 600. Maps are usually accurate when they are made but construction may cause road plans 600 to change. Similarly, man-made obstacles such as an eye catching billboard may cause traffic to slow in a way that may not be apparent from a map. By reviewing past traffic on a route, the changes in velocity may be evaluated and hybrid engagement, engine engagement and transmission gear selection may tailored to the past traffic on the route.

Similarly, past plans 600 and past plan 600 times to determine future predicted traffic. The past plan 600 data may be used in a variety of ways. To predict traffic on a plan 600 at a particular time to determine the proper hybrid plan and engine plan, past traffic may be evaluated at similar times on a similar plan 600. Similarly, the data may be used to select an optimal start time. For example, driving on a plan 600 when there is heavy traffic may not be optimal from a fuel efficiency or time efficiency standpoint. By selecting the start time to avoid heavy traffic, a more efficient trip may be made.

Plans 600 may also be reviewed and selected based on hybrid strategy and engine management strategy. For example, a plan 600 with numerous stop lights may not be preferable to a plan 600 that has few stop lights. Past experience with the plans 600 may also be reviewed as some plans 600 may be especially adapted to use hybrid power sources and save fuel while other plans 600 may be especially adapted to be speedy. Some plans 600 may be more conducive to efficiency or other goals than other plans 600. For example, a plan 600 with many starts and stops may not be efficient from a fuel perspective or from a time perspective. It may make sense to select a plan 600 that is longer but is more efficient from a fuel and/or time perspective.

By using the plan 600 control system, the engine 405 sized for the vehicle may be smaller. Less power may be needed as the hybrid systems 400 may provide excess power meaning the engine 405 does not have to be overly large to provide the excess power. By using a smaller engine, better efficiency may be possible, as the engine 405 may require less fuel.

The constraints on the vehicle 100 may be adjusted and combined into one of a plurality of power strategies. The power strategies may allow an administrator to adjust the goal of the system. One possible goal may be to save fuel while staying within all minimum speed laws. Another possible goal may be to minimize time, again, while being respectful of all speed laws. Other goals may be standard and other may be user created.

As previously mentioned, the system may also be used to applied loads such as a bucket on a vehicle 100 such as a loader. The method may be useful when a loader performs a repeated action such as digging material from a hole in known material. Instead of using just the engine 405, the hybrid power source 400 may be used to provide the needed power to lift the material and the hybrid power source 400 may be engaged to absorb the energy when the load is lowered or when the bucket is lowered.

INDUSTRIAL APPLICABILITY

The described method and system may be used in a variety of ways in an industrial environment. In one aspect, the system may be used in any device 100 that moves. A plan 600 may be analyzed in three dimensions. The weight of the trailer may be determined and the power needed to move the device may be determined. The state of charge of the various hybrid systems 400 may be determined and the amount of power that the hybrid systems 400 may have at various states of the plan 600 may be determined. Thus, the amount of hybrid power 400 and main engine 405 power may be determined.

The system may work for virtual any device in any environment. As previously mentioned, the systems may be on the device, may be remote or may be a combination of local and remote so long as the directions for the hybrid system 400 and engine system 405 are received at the vehicle 100. Even plans 600 in mines may be determined in x, y, z space. While the obstacles may not be traffic, there may still be obstacle which may affect the power plan such as rocks, low ceilings, wash outs, railroad crossings, etc.

The system may be used in other environments rather than just roads. The system may be useful in farming or mining such as with a bucket on a loader. Instead of using just the engine 405, the hybrid power source 400 may be used to provide the needed power to lift the material and the hybrid power 400 source may be engaged to absorb the energy when the load is lowered or when the bucket is lowered.

The invention claimed is:

1. A method of using prediction control for a hybrid work machine to predetermine strategies for operating an engine and hybrid power systems in the hybrid work machine, the method comprising:
    accessing electronic position data for the hybrid work machine wherein the electronic position data comprises three dimensional position data including a height above sea level;
    accessing electronic plan data for the hybrid work machine wherein the electronic plan data is in three dimensions including the height above sea level and comprises a start point, an end point and a proposed plan for traveling from the start point to the end point;
    accessing load data for the hybrid work machine;
    determining a power strategy based at least on changes in the height above sea level along the proposed plan wherein the power strategy comprises an engine management strategy including a speed of the engine for segments of the proposed plan and a hybrid management strategy including when to engage the hybrid power systems for segments of the proposed plan, wherein determining the power strategy comprises analyzing the electronic position data, the electronic plan data and the load data, and wherein the segments include flat segments, negative grade segments and positive grade segments; and
    executing the power strategy at a later time when the hybrid work machine is traveling along the propose plan based on a location of the hybrid work machine along the proposed plan, including executing the engine management strategy to control the speed of the engine for the segments of the proposed plan, and executing the hybrid management strategy to engage the hybrid power systems for segments of the proposed plan.

2. The method of claim 1, wherein the hybrid power systems comprise an electronic storage system, a kinetic storage system and a hydraulic storage system.

3. The method of claim 2, further comprising;
    determining a terminal velocity for the hybrid work machine if no hybrid power systems are engaged;

determining a desired terminal velocity for the hybrid work machine in view of the upcoming proposed plan and the vehicle load; and determining a desired hybrid system engagement in order to obtain the desired terminal velocity.

4. The method of claim 1, wherein the engine management strategy further comprises selecting an optimal gear and selecting an optimal engine speed for the segments of the proposed plan.

5. The method of claim 4, wherein determining the hybrid management strategy further comprises:

analyzing the proposed plan for downhill segments;

determining a minimum desired velocity to reach the downhill segment; and adding a hybrid energy storing segment during the downhill segment wherein one of the hybrid power systems is engaged to create a drag on the hybrid work machine.

6. The method of claim 1, further comprising:

a. identifying segments of the proposed plan including deceleration due to braking;

b. identifying segments of the proposed plan including deceleration due to grade;

c. identifying segments of the proposed plan including acceleration due to plan requirements;

d. identifying segments of the proposed plan including acceleration due to grade;

e. planning hybrid charging during segments of the proposed plan including deceleration due to braking and acceleration due to grade; and f. planning hybrid assist during segments of the proposed plan including acceleration due to plan requirements and deceleration due to grade.

7. The method of claim 1, further comprising determining which of the hybrid power systems to engage.

8. The method of claim 1, further comprising;

identifying braking segments in the proposed plan;

determining a desired velocity during the braking segments;

determining a hybrid system engagement in order to obtain the desired velocity during the braking segments.

9. The method of claim 1, further comprising;

determining acceleration segments of the proposed plan;

determining if there is sufficient hybrid power to meet the acceleration segments; and if there is sufficient hybrid power to meet the acceleration segments, using the hybrid power systems to provide the acceleration.

10. The method of claim 1, wherein global positioning satellites are used to identify a location of the hybrid work machine and to make fine adjustments to the engine management strategy and hybrid management strategy.

11. The method of claim 1, wherein data from past trips on the proposed plan is stored and reviewed to improve future trips on the proposed plan comprising using past trips on the proposed plan and past plan times to at least one of:

determine future predicted traffic; and refine future engine management and future hybrid system use.

12. The method of claim 1, wherein determining a power strategy further comprises analyzing constraints selected from a group consisting of time constraints, speed constraints, current fuel costs constraints, vehicle maximum speeds constraints, construction constraints, accidents constraints and weather constraints.

13. The method of claim 12, wherein the constraints on the vehicle can be adjusted and combined into one of a plurality of power strategies.

14. The method of claim 12, further comprising:

obtaining current traffic data for the proposed plan and an alternative plan;

adjusting expected travel time and fuel use in view of the current traffic;

determining fuel use for the proposed plan and the alternative plan; and selecting one of the proposed plan and the alternative plan based on the determined fuel use.

15. The method of claim 14, further comprising obtaining projected travel times and using the projected travel times to set the power strategy.

16. The method of claim 1, wherein a fuel power strategy comprises minimizing fuel use while satisfying the other constraints and wherein a time power strategy comprises minimizing driving time while satisfying the other constraints.

17. A computer system comprising a processor physically configure according to computer executable instructions, a memory physically configured to store computer executable instructions and an input/output circuit, the computer executable instructions comprising instructions for prediction control for a hybrid work machine to predetermine strategies for operating an engine and hybrid power systems in the hybrid work machine, the instruction comprising instructions for:

accessing electronic position data for the hybrid work machine wherein the electronic position data comprises three dimensional position data including a height above sea level;

accessing electronic plan data for the hybrid work machine wherein the electronic plan data is in three dimensions including the height above sea level and comprises a start point, an end point and a proposed plan;

accessing load data for the hybrid work machine;

determining a power strategy based at least on changes in the height above sea level along the proposed plan wherein the power strategy comprises an engine management strategy including a speed of the engine for segments of the proposed plan and a hybrid management strategy including when to engage the hybrid power systems for segments of the proposed plan, wherein the hybrid power systems comprise an electronic storage system, a kinetic storage system and a hydraulic storage system, wherein determining the power strategy comprises analyzing the electronic position data, the electronic plan data and the load data, and wherein segments include flat segments, negative grade segments and positive grade segments; and executing the power strategy at a later time when the hybrid work machine is traveling along the propose plan based on a location of the hybrid work machine along the proposed plan, including executing the engine management strategy to control the speed of the engine for the segments of the proposed plan, and executing the hybrid management strategy to engage the hybrid power systems for segments of the proposed plan.

18. The computer system of claim 17, further comprising computer executable instructions for:

a. identifying segments of the proposed plan including deceleration due to braking;

b. identifying segments of the proposed plan including deceleration due to grade;

c. identifying segments of the proposed plan including acceleration due to plans requirements;

d. identifying segments of the proposed plan including acceleration due to grade;

e. planning hybrid charging during segments the proposed plan including deceleration due to braking and acceleration due to grade; and f. planning hybrid assist during segments of the proposed plan including acceleration due to plan requirements and deceleration due to grade.

19. A non-transitory computer storage medium physically configured according to computer executable instructions, the computer executable instructions comprising instructions for prediction control for a hybrid work machine to predetermine strategies for operating an engine and hybrid power systems in the hybrid work machine, the instruction comprising instructions for:

accessing electronic position data for the hybrid work machine wherein the electronic position data comprises three dimensional position data including a height above sea level;

accessing electronic plan data for the hybrid work machine wherein the electronic plan data is in three dimensions including the height above sea level and comprises a start point, an end point and a proposed plan for traveling from the start point to the end point;

accessing load data for the hybrid work machine;

determining a power strategy based at least on changes in the height above sea level along the proposed plan wherein the power strategy comprises an engine management strategy including a speed of the engine for segments of the propose plan and a hybrid management strategy including when to engage the hybrid power systems for segments of the proposed plan for the hybrid power systems comprise an electronic storage system, a kinetic storage system and a hydraulic storage system, wherein determining the power strategy comprises analyzing the electronic position data, the electronic plan data and the load data, and wherein segments include flat segments, negative grade segments and positive grade segments; and executing the power strategy at a later time when the hybrid work machine is traveling along the propose plan based on a location of the hybrid work machine along the proposed plan, including executing the engine management strategy to control the speed of the engine for the segments of the proposed plan, and executing the hybrid management strategy to engage the hybrid power systems for segments of the proposed plan.

20. The non-transitory computer storage medium of claim 19, further comprising:

computer executable instructions for determining a terminal velocity for the hybrid work machine if none of the hybrid power systems are engaged;

computer executable instructions for determining a desired terminal velocity for the hybrid work machine in view of the upcoming electronic plan and the load data; and computer executable instructions for determining a desired one of the hybrid power systems to engage in order to obtain the desired terminal velocity.

* * * * *